No. 848,307. PATENTED MAR. 26, 1907.
J. JACOBY.
NUT LOCK.
APPLICATION FILED AUG. 6, 1906.

Witnesses:
Edw. Lindmueller.
Harry J. Gettins.

Inventor:
Josiah Jacoby
By Obed C. Billman
His Attorney.

UNITED STATES PATENT OFFICE.

JOSIAH JACOBY, OF LODI, OHIO.

NUT-LOCK.

No. 848,307.  Specification of Letters Patent.  Patented March 26, 1907.

Application filed August 6, 1906. Serial No. 329,291.

*To all whom it may concern:*

Be it known that I, JOSIAH JACOBY, a citizen of the United States, residing at Lodi, in the county of Medina and State of Ohio, have invented certain new and useful Improvements in Nut-Locks, of which the following is a specification.

My invention relates to improvements in nut-locks; and the paramount object of the invention is to produce a generally improved device of this class which will be exceedingly simple in construction, cheap of manufacture, efficient in use, and much better adapted to its intended purposes than any other device of the same class with which I am acquainted.

Another object is to provide a locking device of this class which can be used in connection with any ordinary bolt without any change in the structure thereof and which will at the same time securely lock the nut in engagement therewith at any desired point without serious injury to the threads thereof or impairing the further usefulness of the bolt and nut.

With these ends in view the invention consists in the novel construction, arrangement, and combination of parts hereinafter described, illustrated in the accompanying drawings, and particularly pointed out in the appended claims.

Figure 1:
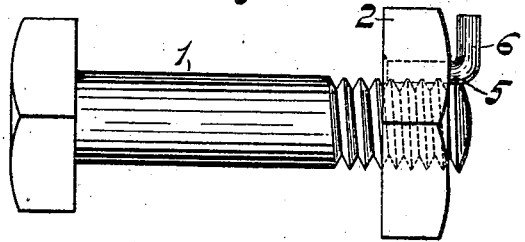
Figure 2:
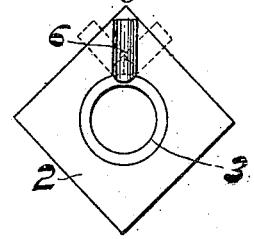
Figure 3:
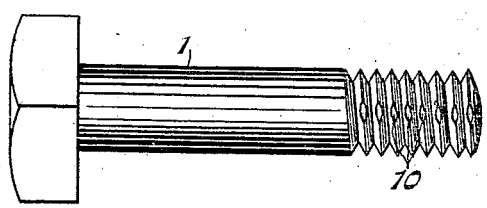
Figure 4:
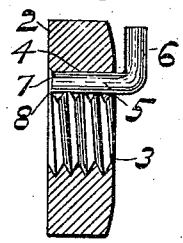
Figure 5:
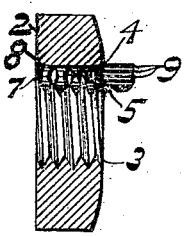

Referring to the accompanying drawings, forming a part of this specification, Figure 1 is a view of an ordinary bolt and nut equipped with my locking device in unlocked position; Fig. 2, an end view of the same; Fig. 3, a detail view of the bolt, showing mutilated threads after having been engaged by the locking device of the nut; Fig. 4, a sectional view of the nut with attached locking device in unlocked position preparatory to securing the nut to the bolt by rotating it thereon to the position desired; Fig. 5, a sectional view of the same, showing locking device in locked position.

Similar characters of reference designate like parts throughout all the figures of the drawings.

The bolt 1 is of the ordinary formation adapted to carry on its threaded end a nut 2, having the usual centrally-located threaded opening 3 and a second small or auxiliary opening 4, containing a revoluble locking bar or pin 5, having its outer end bent over to form a short arm or head 6, by means of which the bar or pin may be moved to and from its locked position.

The opening 4 is formed or bored out of the nut 2 before the thread of the centrally-located nut-opening is cut a short distance from the latter and the locking bar or pin 5 inserted and held in position as against lateral movement or removal by means of a riveted head 7, resting in a corresponding reamed-out portion 8 at the inner end of the second opening 4, the head 7 being flush with the adjacent inner or bearing side of the nut.

When the threads of the nut-opening 3 are cut, the threads will intersect the small opening 4 and the tap will cut short or fragmentary threads 9 (see Fig. 5) on one side of the locking bar or pin 5 and will register with the threads of the nut-opening when the bar or pin 5 is in unlocked position, the short arm or head 6 of the same preferably pointing away from the bolt 1, as shown in Figs. 1, 2, and 4 of the drawings.

By rotating the locking bar or pin 5 until the threads thereof are in register with those of the nut the nut may be run on the bolt in the usual manner until tightened in position. Such is permissible by reason of the fact that the threads of the nut are completed by the relative location of the threads of the pin.

When it is desired to lock the nut in its position on the bolt, the arm or head 6 is tapped with a hammer to the right, as indicated in Fig. 5, or to the right or left, as indicated by dotted lines of Fig. 2, thereby swinging or revolving the pin 5, so that the fragmentary threads 9 (see Fig. 5) are turned out of mesh with the threads of the bolt, and the uncut side of the pin will press or embed itself in the sharp edges of the threads of the bolt by a cam-moving contact, thereby mutilating the same, as at 10 of Fig. 3, and locking the nut securely in position. When the locking-bar 5 is returned to its initial position, the nut may be revolved to tighten or loosen the same, as desired, the threads of the nut acting as a die to recut or form the mutilated friction portions of the threads of the bolt.

From the foregoing description, taken in connection with the accompanying drawings, the operation and advantages of my invention will be readily understood.

Having thus described my invention without having attempted to set forth all the forms in which it may be made or all the modes of its use, I declare that what I claim, and desire to secure by Letters Patent, is—

1. A nut-lock, consisting of a bolt, a nut provided with a threaded opening mounted thereon, an auxiliary opening formed in said nut adjacent to said threaded opening, a revoluble locking-bar mounted in said opening and provided at one side with fragmentary threads registering with the threads of said threaded opening when in its unlocked position, a short arm formed at the outer end of said locking-bar, and a riveted head formed at the inner end of said locking-bar and flush with the friction bearing-surface of said nut.

2. A nut-lock, consisting of a threaded bolt, a nut mounted thereon by means of a threaded opening, a small opening formed therein adjacent to said threaded opening, a cylindrical locking-pin mounted in said small opening and provided at one side with fragmentary threads meshing with the threads of said bolt when the locking-pin is in unlocked position, an operating-arm formed with the outer end of said locking-pin whereby said locking-pin is revolved to embed itself in locking contact with the threads of said bolt.

In testimony whereof I have signed my name to this specification in the presence of two subscribing witnesses.

JOSIAH JACOBY.

Witnesses:
J. S. JOHNSON,
S. L. GAULT.